United States Patent
Weber et al.

(10) Patent No.: US 9,673,992 B2
(45) Date of Patent: Jun. 6, 2017

(54) METHOD FOR OPERATING A NETWORK AS WELL AS A LOCAL NETWORK AND NETWORK COMPONENT

(75) Inventors: Michael Weber, Hannover (DE); Ingo Hütter, Pattensen (DE)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 731 days.

(21) Appl. No.: 12/449,907

(22) PCT Filed: Feb. 19, 2008

(86) PCT No.: PCT/EP2008/051980
§ 371 (c)(1),
(2), (4) Date: Sep. 1, 2009

(87) PCT Pub. No.: WO2008/107302
PCT Pub. Date: Sep. 12, 2008

(65) Prior Publication Data
US 2010/0115629 A1 May 6, 2010

(30) Foreign Application Priority Data
Mar. 2, 2007 (DE) .................... 10 2007 010 789

(51) Int. Cl.
*H04L 9/00* (2006.01)
*G06F 15/16* (2006.01)
(Continued)

(52) U.S. Cl.
CPC ........ *H04L 12/2821* (2013.01); *G06F 21/629* (2013.01); *H04L 63/102* (2013.01); *H04L 2012/2849* (2013.01)

(58) Field of Classification Search
USPC .......................................... 726/30
See application file for complete search history.

(56) References Cited

U.S. PATENT DOCUMENTS

| 4,780,821 A | 10/1988 | Crossley et al. |
| 6,523,067 B2 | 2/2003 | Mi et al. |

(Continued)

FOREIGN PATENT DOCUMENTS

| CN | 1878176 | 12/2006 |
| DE | 60031378 | 2/2001 |

(Continued)

OTHER PUBLICATIONS

Alt, J., "Introduction to UNIX", Computing Center Leibniz User Document No. 8801/5, Computer Center Leibniz of the Bavarian Academy of Sciences, Munich, Germany, Jul. 1, 1993, pp. 16-17 and 88-90.

(Continued)

*Primary Examiner* — Michael R Vaughan
(74) *Attorney, Agent, or Firm* — Tutunjian & Bitetto, P.C.

(57) ABSTRACT

The invention relates to a method for operating a network as well as a local network comprising network components and to network components, in particular of a home network, where a functional command is generated, which is configured to execute an assigned function in a network station, wherein a user identification, which is derived from the collected user data, is assigned to the functional command, the assigned user identification is evaluated in the network station in response to executing the functional command and the functional command is executed when, in response to the evaluation of the corresponding user identification, it is established that the functional command is approved in connection with the assigned user identification.

14 Claims, 1 Drawing Sheet

(51) Int. Cl.
  *H04L 12/28* (2006.01)
  *G06F 21/62* (2013.01)
  *H04L 29/06* (2006.01)

(56) References Cited

U.S. PATENT DOCUMENTS

| | | | | |
|---|---|---|---|---|
| 7,143,296 | B2* | 11/2006 | Hirata | 713/189 |
| 7,193,531 | B2* | 3/2007 | Ito et al. | 340/988 |
| 7,222,088 | B2* | 5/2007 | Nishikado et al. | 705/26.1 |
| 7,451,492 | B2* | 11/2008 | Iga | 726/30 |
| 7,454,626 | B2* | 11/2008 | Hirata | 713/189 |
| 7,567,800 | B2* | 7/2009 | Uematsu et al. | 455/414.3 |
| 7,568,235 | B2* | 7/2009 | Bird et al. | 726/27 |
| 7,606,401 | B2* | 10/2009 | Hoffman et al. | 382/124 |
| 7,657,597 | B2* | 2/2010 | Arora et al. | 709/206 |
| 7,660,756 | B2* | 2/2010 | Nakamura et al. | 705/35 |
| 7,720,961 | B2* | 5/2010 | Levi et al. | 709/224 |
| 7,747,446 | B2* | 6/2010 | Blass et al. | 704/275 |
| 8,059,818 | B2* | 11/2011 | Asokan et al. | 380/277 |
| 8,706,841 | B2* | 4/2014 | Gordon et al. | 709/218 |
| 2002/0162031 | A1* | 10/2002 | Levin et al. | 713/202 |
| 2002/0197953 | A1* | 12/2002 | Nagaoka et al. | 455/2.01 |
| 2003/0202101 | A1 | 10/2003 | Alvarado et al. | |
| 2004/0006621 | A1* | 1/2004 | Bellinson et al. | 709/225 |
| 2004/0064512 | A1 | 4/2004 | Arora et al. | |
| 2004/0218897 | A1 | 11/2004 | Kudoh et al. | |
| 2005/0108091 | A1 | 5/2005 | Sotak et al. | |
| 2006/0048205 | A1* | 3/2006 | Poslinski | 725/134 |
| 2006/0187309 | A1* | 8/2006 | Ban et al. | 348/211.2 |
| 2007/0011446 | A1* | 1/2007 | Kato | G06F 21/305 |
| | | | | 713/150 |
| 2007/0022467 | A1 | 1/2007 | Filbrich | |
| 2007/0261109 | A1* | 11/2007 | Renaud et al. | 726/6 |
| 2007/0288623 | A1* | 12/2007 | Kato | G06F 21/33 |
| | | | | 709/223 |
| 2008/0016582 | A1* | 1/2008 | Morimoto | 726/28 |
| 2009/0193250 | A1* | 7/2009 | Yokota et al. | 713/156 |
| 2009/0210240 | A1* | 8/2009 | Benschop et al. | 705/1 |
| 2011/0287757 | A1* | 11/2011 | Nykoluk et al. | 455/419 |
| 2014/0122601 | A1* | 5/2014 | Poston et al. | 709/204 |

FOREIGN PATENT DOCUMENTS

| | | | |
|---|---|---|---|
| EP | 0689316 | | 12/1995 |
| EP | 1157380 | | 2/2001 |
| EP | 1383279 | | 1/2004 |
| EP | 1494411 | | 1/2005 |
| EP | 1691525 | | 8/2006 |
| JP | 2000235546 | | 8/2000 |
| JP | 2004021666 | | 1/2004 |
| JP | 2004063032 | | 2/2004 |
| JP | 2004191496 | | 7/2004 |
| JP | 2005339599 | | 12/2005 |
| JP | 2006005759 | | 1/2006 |
| JP | 2006338573 A | * | 12/2006 |
| JP | 2007501967 | | 2/2007 |
| JP | 2012051147 A | * | 3/2012 |
| WO | WO2005010879 | | 2/2005 |

OTHER PUBLICATIONS

Alt_et_al_Einführung_in_UNIX_Leibniz_Rechenzentrum_der_bayerischen_Akademie_der_Wissenschaften_LRZ-Benutzerschrift_nr_8801_5_Juli_1993_pp._16_17_88_90_Chapter_1.5.2.1_6.7.1_6.7.

Search Report Dated Dec. 3, 2008.

* cited by examiner

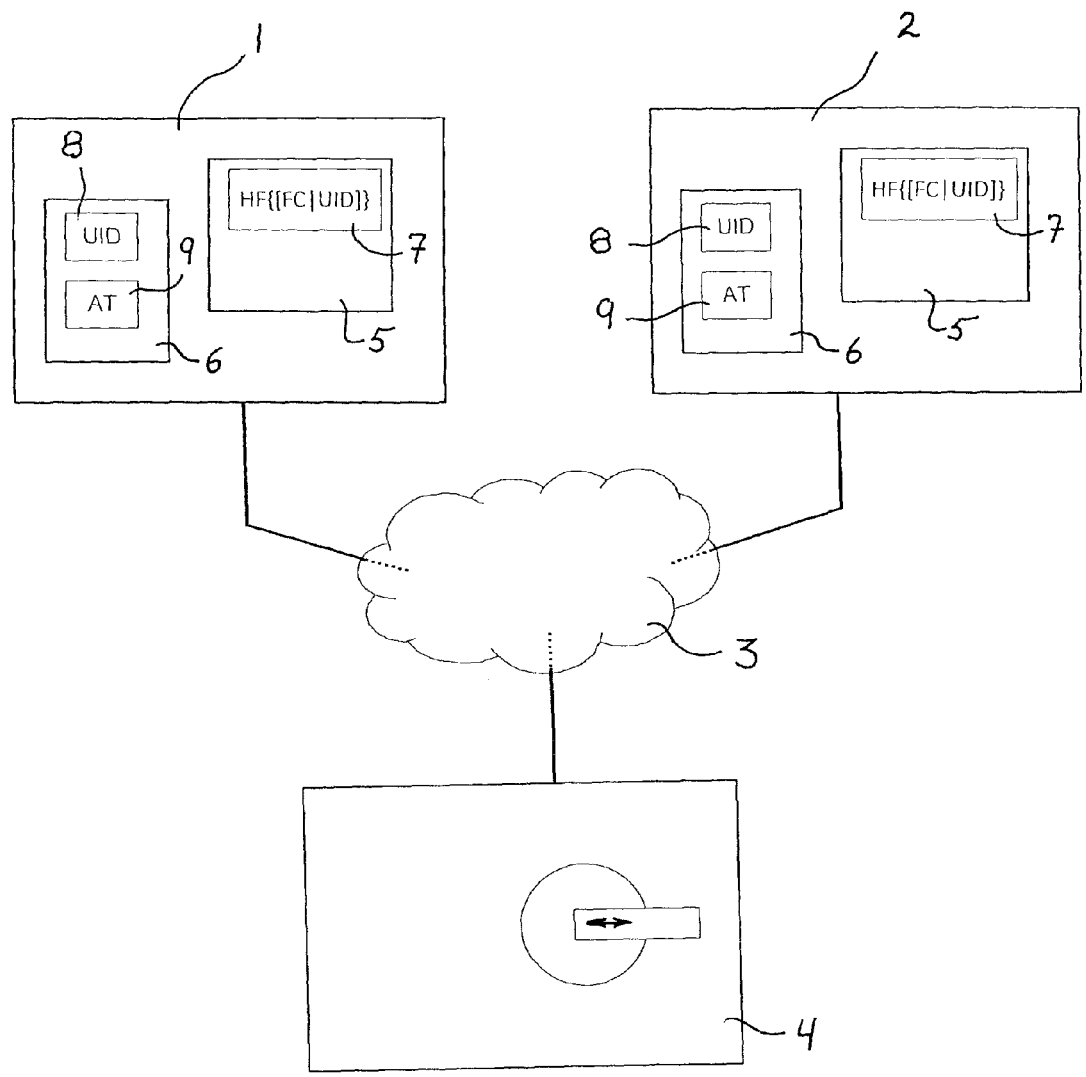

METHOD FOR OPERATING A NETWORK AS WELL AS A LOCAL NETWORK AND NETWORK COMPONENT

This application claims the benefit, under 35 U.S.C. §365 of International Application PCT/EP2008/051980, filed Feb. 19, 2008, which was published in accordance with PCT Article 21(2) on Sep. 12, 2008 in English and which claims the benefit of German patent application No. 10 2007 010 789.9, filed Mar. 2, 2007.

The invention relates to a method for operating a network, in particular a home network, to a local network, to a first network component and a second network component.

STATE OF THE ART

The combination of electronic components to form networks is becoming more and more important in the home as well. From this emerge so-called home networks, which can typically include television sets, recording and play-back components for electronic media, for example for video tapes, CD-ROMs, DVDs or the like, image and video data memory, hi-fi systems and similar devices, which are electronically connected with one another. However, it is also possible to integrate further household appliances, which are configured as network-ready components, in such a home network.

An important advantage of the networking is the possibility to be able to access the different components from different locations. On principal, access is possible via each of the components. In standard home networks, however, access is possible via controlling network components or control point devices (CPs—"Control Points"), which are configured to generate functional commands and to transfer them via the network to other components in the network for execution.

A personal computer in a workroom as well as a television set in a living room, for example, can be configured in a house as control point devices, which can access a video unit and a satellite receiver, so as to permit a certain broadcast program to be recorded. Standard home networks use the UPnP-standard (UPnP—"Universal Plug and Play").

The presence of a plurality of persons in a household can hereby lead to collisions. When, in the above example, the television set is operated by a first user and the personal computer is operated by a second user, the two control devices can send conflicting functional commands to the video unit. With presently available home networks, the command of the two commands, which arrives at a later point in time would overwrite or modify the command, which arrived beforehand.

The users would thus not have any guarantee that the commands, which they programmed, will not possibly be modified or even deleted by other users before or while the commands are being carried out. Likewise, standard home networks have the problem that, on principle, each user has access to all of the data stored in the network. This is alarming, in particular in view of the protection of minors.

INVENTION

It is the object of the invention to create a method for operating networks and a network as well as corresponding network components, with which the access of a plurality of users to network components is improved so as to ensure a collision-free operation.

This object is solved according to the invention by means of a method according to the independent claims.

According to the invention, provision is made for a method for operating a network, in particular for operating a home network, with a functional command being generated, which is configured for executing an assigned function in a network station, wherein a user identification, which is derived from the collected user data, is assigned to the functional command, the assigned user identification is evaluated in the network station in response to executing the functional command and the functional command is executed when, in response to the evaluation of the corresponding user identification, it is established that the functional command is approved in connection with the assigned user identification.

According to another aspect of the invention, provision is made for a local network comprising network components, in particular a home network comprising a control unit, which is configured to generate a functional command, an allocation unit, which is connected with the control unit and which is configured to generate an allocation between a user identification derived from user data and the functional command, a processing unit, which is connected with the control unit and which is configured to evaluate the assigned user identification and an execution unit, which is connected with the control unit and the processing unit and which is configured to execute the functional command, when, in response to the evaluation of the corresponding user identification, it is established that the functional command is approved in connection with the assigned user identification.

The invention includes the idea of assigning a user identification to the generated functional command and to thus establish a connection of the functional command with a user. Advantageously, the user, whose user identification is assigned to the functional command, is a user, for whom and/or as a response to whose action, the functional command was generated. A personalization of the functional command is thus effected in the network. As compared to standard methods for operating home networks, such a personalization has the advantage that there is always a logical connection between a function, which is executed in the home network, and the user. The allocation can be formed, for example, by means of an allocation table, which is stored in a memory.

To obtain the personalization, the user identification is derived from previously collected user data. Advantageously, the user data include a user name and a user password, which are stored in a user account and which are requested from the user in response to every log-in process or only in response to a first-time log-in process.

An advantageous development of the invention provides for the functional command to include a control command for controlling a preprogrammed process and, upon executing the functional command, for a verification as to whether an identifier is assigned to the preprogrammed process, wherein the evaluation of the user identification, which is assigned to the functional command, includes a comparison of the user identification with the identifier, which is assigned to the programmed process. It is thus made possible that the preprogrammed process, for example an action for receiving and storing a certain radio or television program, which is to be executed by means of a tuner, cannot be modified or even deleted by any user. Certain changes to the preprogrammed process are approved only in context with certain user identifications, that is, only with certain users.

The control of the preprogrammed process can hereby include a modification as well as a complete deletion of the preprogrammed process.

A preferred embodiment of the invention provides for the functional command to include an access command to electronic data, which are stored in a memory, and, upon executing the access command, for a verification as to whether an identifier is assigned to the electronic data, wherein the evaluation of the user identification includes a comparison of the user identification, which is assigned to the electronic data, with the assigned identifier. Through this, the circle of users, who have access to the electronic data, is limited. Access to the electronic data hereby also includes a modification or deletion of the electronic data.

An advantageous improvement of the invention provides for the electronic data, which are stored in the memory, to include user account data. Through this, access to the user account data is limited. It can thus be achieved, for example, that each user only has access to his own user account data for updating them or for copying them from one network component to another one.

In response to an execution of the functional command, a development of the invention preferably provides for the generation of process data, which describe a process, which is to be initiated as a result of the functional command, wherein an identifier, which corresponds to the user identification assigned to the functional command, is assigned to the electronic process data. The process is thus characterized as being programmed by the user so that only said user, for example, can execute a modification.

A preferred embodiment of the invention provides for the functional command to include a command for generating electronic data, wherein, in response to the execution of the functional command, the electronic data are generated and an identifier, which corresponds to the user identification assigned to the functional command, is assigned to the electronic data.

An advantageous improvement of the invention provides for the generated electronic data to include user account data. The user account data include user information for a user, for example a user name, which is consistent in the entire home network, a user identification and/or settings for network components, which are preferred by the user. The user account can be protected by means of a user password, which can also be stored in the user account.

A preferred embodiment of the invention provides for the user identification to include specific user information.

For example, the specific user information can be information regarding the age of the user. Through this, an implementation of functions for the protection of minors is made possible. The specific user information can be stored in the user account data.

An advantageous development of the invention provides for the identifier to be assigned to the electronic process data or to the electronic data by means of an allocation table, which is stored in a memory. The allocation table can either be stored in a memory of one of the network components or of a plurality of the network components or in a memory, which is connected with all of the network components.

An advantageous improvement of the invention provides for the generation and the execution of the functional command and for the evaluation of the user identification to at least partly be executed on different network components of the network, which are connected with one another in a data-technical manner. On the basis of inputs by a user, a controlling network component, for example, can generate the functional command, can assign a user identification to it and can subsequently transfer it to a controlled network component, which is to execute the functional command. The functional command is then collected by the controlled network component and the assigned user identification is evaluated so as to verify whether the functional command is approved in connection with the assigned user identification, in which case the functional command is executed by the controlled network component. As an alternative, the controlling and the controlled network component can be combined in a network device.

The controlled network components can be a server as well as a renderer. Here, "server" refers to those units, which supply data of any format to the network. This includes electronic memories as well as tuners and media servers. Contrary thereto, renderers are units, which process data provided by the servers and which make them accessible to the user. It can be an image, video or audio output device, for example.

An advantageous embodiment of the invention provides for the user identification to include a value, which is determined from the collected user data by means of a hash function. From a data quantity, a hash function or erratic value function determines a so-called hash value, which generally requires a smaller memory than the original data quantity. It can be understood as a type of encryption algorithm. As a rule, it is not possible and it is also not desirable to draw direct conclusions to the encrypted data quantity by means of an analysis of the hash value.

Preferably, a development of the invention provides for the user data to include a user password, which is input by the user. By collecting a user password, which only the user knows, for deriving the user identification, it is ensured that the user identification cannot be falsified.

DRAWING

The invention will be illustrated in more detail below by means of exemplary embodiments. The sole FIG. hereby shows a schematic illustration of a home network comprising network components, two of which are embodied as control point devices.

EXEMPLARY EMBODIMENTS

The FIG. shows a schematic illustration of a home network, which is configured to carry out a method for producing and executing functional commands. The home network includes a network component, which is configured as a first control point device 1, as well as a further network component, which is configured as a second control point device 2. Each control point device 1, 2 including a processing unit 5 and memory 6. As shown, the processing unit 5 can be any suitable processing device and is configured to include the building block (i.e., block 7) for generating the hash function (HF) with the functional command (FC), to which the user identification (UID) 8 contained in the memory 6 is appended. In addition to the UID 8, memory 6 also includes an allocation table (AT) 9. Furthermore, provision is made for a controlled network component 4 (e.g., a DVD or disc player), which receives and executes functional commands generated by the control point devices 1, 2. The control point devices 1, 2 and the controlled network component 4 are connected with one another in a data-technical manner via a network structure 3. The network structure 3 can encompass further controlling and/or controlled network components, which are not separately illustrated in the FIG.

Those network components, with which a user can generate a functional command, which is subsequently executed in the network by means of the control point device itself or by means of other network components, are referred to as control point devices. For example, the user can set a desired configuration in a television set by means of operating elements. However, he can also program further network components of the home network, for example a DVD player, or he can prompt them to execute a function by means of the operating elements on the television set. To some extent, the further network components can be configured as control point devices themselves. The control point device thus includes at least one control unit, which is configured to generate a functional command.

A user who operates the first control point device 1 for programming the controlled network component 4 must initially identify himself at the first control point device 1 by means of a user name and a user password or by means of a user key. If a user account under the corresponding user name is already available on the first control point device 1, the input user password is evaluated and, upon compliance with the user password stored in the user account, the user account is released. Furthermore, the user account includes a user identification, which is the result of the user name and the user password.

In accordance with the instructions by the user, a functional command, which is configured to execute the function desired by the user in the control network component 4 is then generated by means of the control point device 1. Furthermore, a user identification hash value, which was determined from the user identification by means of a hash function, is assigned to the generated functional command. The allocation can be carried out, for example, in that the electronic functional command data, which describe the functional command, are supplemented by the user identification hash value. In the alternative, an allocation between the functional command and the user identification hash value can be formed by means of an entry into an allocation table.

The functional command is then transmitted to the controlled network component 4 via the network structure 3. There, it is initially verified whether the function assigned to the functional command would be capable of colliding with a previously programmed process. If the controlled network component 4 is a DVD player, for example, which was previously programmed to play the content of a certain DVD, a functional command with the instruction to play a different DVD, will lead to a collision. In this case, the user identification hash value, which is assigned to the functional command by means of the control point device 1, is evaluated, for example by comparing the user identification hash value with an identifier, which is assigned to the programmed process. The functional command is executed, if a determination is made in the course of the evaluation that the user is the same user to whom the previously programmed process is ascribed. In the afore-described case, the functional command is interpreted as a control command for controlling the previously programmed process, for example by means of a modification, overwriting or termination of the process.

Upon execution of the functional command, a further identifier, which corresponds to the user identification hash value, is assigned to the process, which is programmed by means of the functional command. The programmed process is thus personalized so that it can only be modified by the user. When a further user subsequently logs into the home network by identifying himself to the second control point device 2 with his own user name and a user password and approves a further functional command, which is to be sent to the controlled network component, to be generated, the second control point device 2 generates a further user identification hash value and assigns it to the further functional command.

When the functional command generated by the second control point device 2 collides with the process, which is programmed as a result of the functional command by the first control point device 1, the controlled network component 4 will determine during the evaluation of the assigned user identification hash value that it is a different user so that the functional command is not authorized. In this case, the user on the second control point device 2 can be informed, for example, that the controlled network component 4 is occupied—and, if applicable, by whom.

Access to electronic data stored in a memory of the controlled network component is treated similarly to the controlling of a preprogrammed process in the home network. For this, an identifier, which corresponds to a user identification hash value, is assigned to the electronic data. When the further user at the second control point device 2 wants to access the electronic data, a corresponding functional command is generated there, to which a user identification hash value, which is derived from the user data of the further user, is assigned. The generated functional command is then transmitted to the controlled network component 4, which evaluates the user identification hash value according to the above approach and verifies whether a data access is authorized.

It is advantageous that all of the network components determine the same user identification hash value for a user on the basis of his user data. A plurality of different identifiers can also be assigned to a programmed process or to stored electronic data so that a control of the preprogrammed process or access to the stored electronic data by different users is authorized.

The network components, in particular the control point devices, do not need to know everything about the available user accounts, whereas, however, a reconciliation of all of the user accounts between the control point devices is advantageous so as to avoid having to set up a new user account for a user at every control point device 1, 2. For this, provision is made for a service for transferring or for at least partially copying user accounts from one control point device 1, 2 to another control point device 1, 2.

When a user account is newly set up, it is automatically transferred or copied to the other control point devices 1, 2 by the service. Increased control over the duplication of the user accounts can be ensured in that corresponding information, for example a copy-protection indicator, is stored in the user account when setting up a user account. To duplicate the user account, the appropriate user must then either log into the control point device 1, 2, which includes the user account, which is to be copied or on which the user account is to be copied. The user can then send a copy request from the respective control point device 1, 2 to the other control point device 1, 2. In this case, the above-described method is also used for accessing electronic data, wherein the electronic data are now the user account data from the user account.

For increased security, provision can be made for the user identification, which is used for accessing user account data, to differ from the user identification, which is used for accessing other electronic data and for controlling preprogrammed processes. This is achieved, for example, by means of using different hash functions when determining the user identification hash value.

When the user makes changes to his user account, the user accounts in the network must remain consistent. The control point device 1, 2, on which a user account was updated, sends an event or an incident message to the other control point devices 1, 2 in the network for informing them of the update. The other control point devices 1, 2 are then able to query the current user account data from the control point device 1, 2.

When changing a user account, a time mark or a timestamp are generated and are stored in the user account. In response to the query of the user account data, the timestamp is transmitted therewith so that the up-to-dateness of the user accounts can be compared. The control devices 1, 2 can thus update the user accounts among one another without requiring an intervention by the user. When updating a user account, the user identification used for this purpose is evaluated by the queried control point device 1, 2 as well as by the control point device 1, 2 making the query, so as to prevent an unauthorized query as well as falsified user account data.

For the protection of minors it is advantageous when certain functions, for example the downloading and playing of video data, which are inappropriate for minors, are only authorized when the user has reached a certain minimum age. For this purpose, the instant methods store a user account date in the user account, which includes information relating the age of the user, for example his year of birth. When generating the functional command, this additional user account date, in addition to the user identification, is also assigned to the functional command and is evaluated when the functional command is executed in that it is compared with corresponding information relating to the protection of minors, which are assigned to the requested video data. For television programs, for example, such information relating to the protection of minors can be listed in an electronic TV guide, also called EPG ("Electronic Program Guide"), which the network can access.

Further embodiments are possible. For example, the classification of electronic data on a media server as public or private data by means of assigning corresponding identifiers, wherein access is authorized only by means of certain user identifiers. Furthermore, a network component, for example, which is configured as a recorder and which was programmed by a plurality of users to record programs, which are broadcast at different times, can output a list of the earmarked programs with the appropriate users upon request.

To ensure compatibility with conventional home network standards, such as UPnP for example, additional method steps, which provide for the allocation of the user identification and, if applicable, further user account data, for example the birth year, must be introduced for the new protocols. A control point device 1, 2 then recognizes immediately when a network component, for example a server, does not know a personalization, because the network component then answers with an error. In this case, the control point device 1, 2 again transmits the functional command to the network component, however by means of the known protocols, that is, without an assigned user identification.

Furthermore, for making an inquiry regarding available data, a browser command of the UPnP standard can be provided with an option, via which the user can specify whether only the private contents, all contents or only the public contents are to be retrieved.

With the UPnP standard, an http protocol (hypertext transfer protocol) is often used when transferring data from a server to a renderer. Commands for playing back the data are hereby transmitted to a module in the renderer, which is identified as an AV transport service (AV stands for audio and video), which is responsible for the data transfer. In addition to the existing methods of the AV transport service for controlling the data transfer, new method steps, which additionally transfer the user identification hash value, must also be initiated here. Due to the fact that the renderer does not have any information as to whether the user is authorized to access the requested data, the renderer must send the user identification hash value to the server during the data transfer. This can take place, for example, by means of additional http parameters or URL parameters. When no authorized user identification hash value or an unauthorized user identification hash value is transferred from the renderer to the server in response to a request or inquiry for private data, the server denies the data transfer and the renderer sends an error message to the control point device. If the renderer does not identify a personalization, he will respond with an error message, for example with identification number 402 ("Invalid Arguments"—invalid parameters) and only the original UPnP methods, with which public data of the server can be accessed, are then authorized for use.

When an RTP protocol ("Real-Time Transport Protocol") is used in connection with an RTSP protocol ("RealTime Streaming Protocol") instead of an http protocol for the transfer between server and renderer, the method can be appropriately adapted to the RTSP protocol. Instead of the http status code 402 ("Invalid Arguments"), an appropriate RTSP status code, for example with identification number 400 ("Bad Request"), is then sent.

The features of the invention disclosed in the above description and in the claims can be important for the realization of the invention in its various embodiments, both individually and in any combination thereof.

The invention claimed is:

1. A method for operating a home network, where a functional command is generated responsive to a user action of a second user, which is configured to execute an assigned function in a network station, wherein user data is made available for the second user activating the functional command, an individual user identification is derived from the available user data and assigned to the functional command, the method comprising:
   transferring the functional command including the assigned user identification for the second user over the network to the network station,
   assigning an identifier to an audio/video data play back or audio/video data recording process, said identifier having been assigned to said audio/video data play back or audio/video data recording process by the time a first user has preprogrammed said audio/video data playback or audio/video data recording process,
   wherein the functional command includes a control command for controlling said preprogrammed audio/video data playback or audio/video data recording process, and
   upon executing the functional command, verifying in said network station whether the identifier is assigned to the preprogrammed audio/video data playback or audio/video data recording process, wherein the verification includes a comparison of the user identification for the second user with said identifier, wherein the preprogrammed audio/video data playback or audio/video data recording process is locked, until the preprogrammed audio/video data playback or audio/video data recording process is carried out, and therefore cannot be modified by execution of the functional command if the user identification for the second user does not match the identifier assigned to the preprogrammed audio/video data playback or audio/video data recording process.

2. The method according to claim 1, wherein the electronic data stored in the memory include user account data.

3. The method according to claim 1, wherein, upon executing the functional command, process data are generated which describe a process, which is to be initiated as a result of the functional command, wherein an identifier, which corresponds to the user identification assigned to the functional command, is assigned to the electronic process data.

4. The method according to claim 1, wherein the identifier is assigned to the electronic process data or to the user account data by means of an allocation table, which is stored in a memory.

5. The method according to claim 1, wherein the user identification includes a value, which is determined from the collected user data by means of a hash function.

6. The method according to claim 1, wherein the user data include a user password, which is input by the user.

7. The method according to claim 1, wherein the derived user identification comprises the age of the user.

8. An apparatus for the use in a method according to claim 1, the apparatus comprising:
a preprogrammed audio/video data play back means or a preprogrammed audio/video data recording means, said audio/video data play back means or audio/video data recording means performing an audio/video data play back process or audio/video data recording process in the preprogrammed form,
wherein an identifier is assigned to said audio/video data play back process or audio/video data recording process, said identifier having been assigned to said audio/video data play back process or audio/video data recording process by the time a first user has preprogrammed the audio/video data play back or audio/video data recording process,
the apparatus further comprising a processing unit configured to evaluate an individual user identification of a second user, which is assigned to a functional command received over the network from a network station, wherein the functional command includes a control command for controlling said running preprogrammed audio/video data play back or audio/video data recording process of the network component;
an execution unit configured to execute the functional command, and verify whether an identifier is assigned to said running preprogrammed audio/video data play back or audio/video data recording process, the verification operation including a comparison of the user identification of the second user from the received functional command with the identifier, which is assigned to said running preprogrammed process, wherein the preprogrammed process is locked, until the preprogrammed process finishes running, and cannot be modified by execution of the received functional command if the user identification of the second user does not match the identifier assigned to the preprogrammed audio/video data play back or audio/video data recording process.

9. The apparatus according to claim 8, wherein the electronic data stored in the memory include user account data.

10. The apparatus according to claim 8, wherein, upon executing the functional command, process data is generated which describes a process, which is to be initiated as a result of the functional command, wherein an identifier, which corresponds to the user identification assigned to the functional command, is assigned to the electronic process data.

11. The apparatus according to claim 8, wherein the identifier is assigned to the electronic process data or to the user account data by means of an allocation table, which is stored in a memory.

12. The apparatus according to claim 8, wherein the user identification includes a value, which is determined from the collected user data by means of a hash function.

13. The method according to claim 8, wherein the user data include a user password, which is input by the user.

14. The method according to claim 8, wherein the derived user identification comprises the age of the user.

* * * * *